US012571316B2

(12) United States Patent
Lehmann et al.

(10) Patent No.: US 12,571,316 B2
(45) Date of Patent: Mar. 10, 2026

(54) TURBINE BLADE, IN PARTICULAR FOR A GAS TURBINE ENGINE

(71) Applicant: Rolls-Royce Deutschland Ltd & Co KG, Blankenfelde-Mahlow (DE)

(72) Inventors: Knut Lehmann, Königs Wusterhausen (DE); Markus Weinert, Rangsdorf (DE); Hans-Martin Schlesier, Berlin (DE)

(73) Assignee: ROLLS-ROYCE DEUTSCHLAND LTD & CO KG, Blankenfeld-Mahlow (DE)

( * ) Notice: Subject to any disclaimer, the term of this patent is extended or adjusted under 35 U.S.C. 154(b) by 0 days.

(21) Appl. No.: 19/219,003

(22) Filed: May 27, 2025

(65) Prior Publication Data

US 2026/0002446 A1 Jan. 1, 2026

(30) Foreign Application Priority Data

Jun. 28, 2024 (DE) ..................... 10 2024 206 063.1

(51) Int. Cl.
*F01D 5/18* (2006.01)

(52) U.S. Cl.
CPC ........ *F01D 5/186* (2013.01); *F05D 2230/211* (2013.01); *F05D 2250/75* (2013.01); *F05D 2260/202* (2013.01); *F05D 2260/2212* (2013.01)

(58) Field of Classification Search
CPC ................................ F01D 5/186; F01D 5/187
See application file for complete search history.

(56) References Cited

U.S. PATENT DOCUMENTS 6,517,312 B1 2/2003 Jones
7,600,973 B2 10/2009 Tibbott
(Continued)

FOREIGN PATENT DOCUMENTS

DE 1135158 B 8/1962
DE 1416201 U 8/1987
(Continued)

OTHER PUBLICATIONS

German Search Report dated Feb. 3, 2025 from counterpart German App No. 102024206063.1.
(Continued)

*Primary Examiner* — Sabbir Hasan
(74) *Attorney, Agent, or Firm* — SHUTTLEWORTH & INGERSOLL, PLC; Timothy J. Klima

(57) ABSTRACT

A turbine blade, having an airfoil and, in an installed state, extending radially with an axial inclination from a leading edge to a trailing edge, and in which a cooling channel is formed. The cooling channel has a leading channel portion, which extends at least predominantly radially, close to the leading edge, a trailing channel portion, which extends at least predominantly radially, close to the trailing edge, and an inner channel portion, situated between these and oriented at least predominantly radially, as well as a first and second deflecting portion, which connect these channel portions. In relation to a cooling fluid passed through the cooling channel arrangement during cooling operation, the leading channel portion or the trailing channel portion forms the inlet-side channel portion. Efficient cooling is brought about by the inner channel portion being arranged downstream of the leading channel portion and of the trailing channel portion.

9 Claims, 2 Drawing Sheets

(56) References Cited

U.S. PATENT DOCUMENTS

Figure 1:
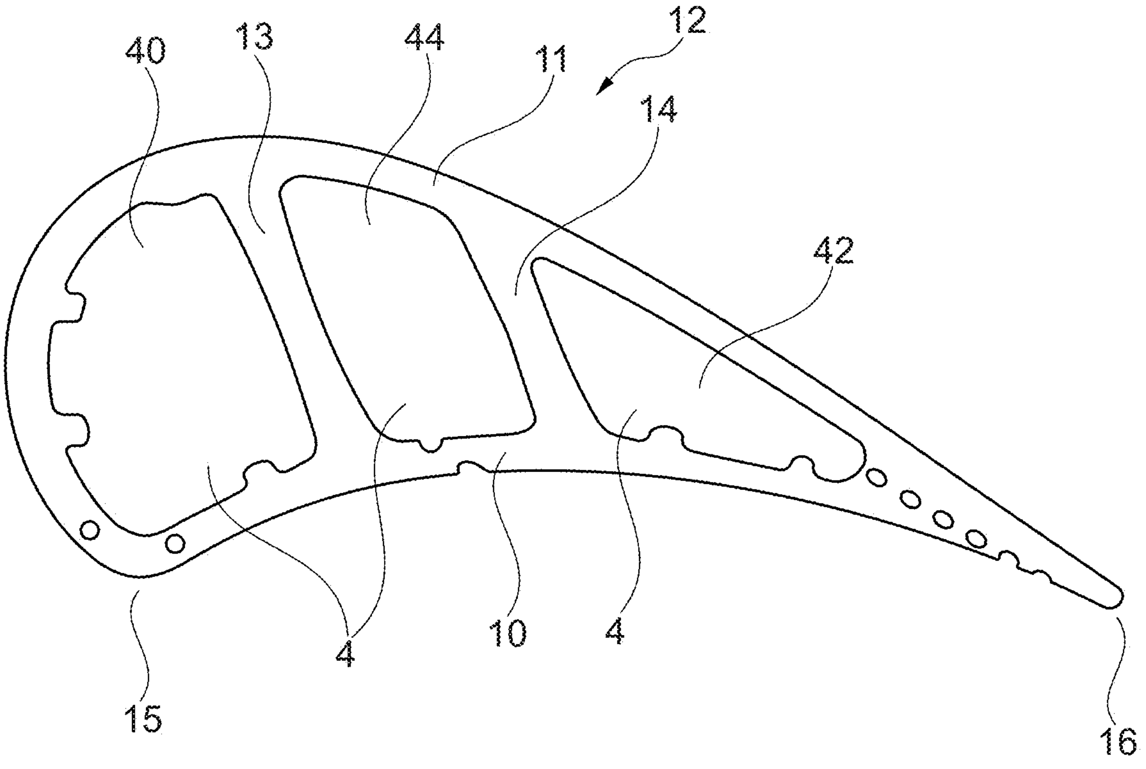

| | | | | |
|---|---|---|---|---|
| 7,967,563 | B1 * | 6/2011 | Liang | F01D 5/187<br>415/115 |
| 8,182,224 | B1 | 5/2012 | Liang | |
| 9,518,468 | B2 * | 12/2016 | Tibbott | F01D 5/20 |
| 2019/0145266 | A1 | 5/2019 | Crites | |

FOREIGN PATENT DOCUMENTS

| | | | |
|---|---|---|---|
| DE | 69105837 | | 1/1995 |
| DE | 60028529 | | 7/2006 |
| EP | 1063388 | A2 | 12/2000 |
| EP | 3306036 | A1 | 4/2018 |
| KR | 101513474 | B1 | 9/2014 |

OTHER PUBLICATIONS

European Search Report dated Nov. 13, 2025 from counterpart European App No. 25185447.7.

* cited by examiner

TURBINE BLADE, IN PARTICULAR FOR A GAS TURBINE ENGINE

This application claims priority to German Patent Application 102024206063.1 filed Jun. 28, 2024, the entirety of which is incorporated by reference herein.

The invention relates to a turbine blade, in particular for a gas turbine engine, having a blade airfoil, which has a pressure-side wall portion and a suction-side wall portion and, with respect to an installed state, extends radially and with an axial inclination from a leading edge to a trailing edge, and in which a cooling channel arrangement having at least one cooling channel is formed, which cooling channel has a leading channel portion, which extends at least predominantly radially, close to the leading edge, a trailing channel portion, which extends at least predominantly radially, close to the trailing edge, and an inner channel portion, which is situated between these and is oriented at least predominantly radially, as well as a first and second deflecting portion, which connect these channel portions, wherein, in relation to a cooling fluid passed through the cooling channel arrangement during cooling operation, the leading channel portion or the trailing channel portion forms the inlet-side channel portion. The invention furthermore relates to a method for producing such a turbine blade, and to a high-pressure turbine equipped with the said blade.

A turbine blade of this kind is indicated in DE 691 05 837 T2. In the case of this known turbine blade, a blade body or blade airfoil extends substantially radially between a centrally located blade root and an outer blade ring portion and, in the interior of the blade airfoil, has a cooling channel arrangement with a cooling channel which comprises a first channel portion that is on the leading side in relation to an installed state in a turbine, and a second channel portion, which is deflected thereon through about 180° via a bent portion, wherein the channel portions, which are thus situated side by side, are separated from one another by means of a, generally flat, wall that is thickened locally in the region of the bend.

DE 600 28 529 T shows ceramic turbine blades with a cooled trailing edge.

Various other embodiments of turbine blades with different designs of a cooling channel arrangement in the blade airfoil are shown in U.S. Pat. Nos. 7,600,973 B2, 7,967,563 B1, 9,518,468 B2, KR 101513474 B1 and U.S. Pat. No. 7,967,563 B1. Here, channel portions likewise merge into one another substantially through 180° via deflections, wherein various deflecting portions and mutually adjacent channel portions are present.

The cooling channel arrangement formed in this way in the blade airfoil of the turbine blade comprises, for example, a serpentine cooling channel which can be formed for the through flow of a cooling fluid from the trailing edge towards the leading edge in the forward direction or vice versa in the rearward direction. The channel arrangement designed for through flow in the rearward direction generally results in particularly good cooling in the front and central portion of the blade airfoil but less good cooling at the end of the internal cooling passages, i.e. in the rear radially outer region of the blade or in the trailing edge region thereof and the radially outer region.

To produce the turbine blade with the complex internal cooling channels, a precision casting method is used. The casting mold consists of a ceramic shell (for the outer blade shape) and a conical core, which defines the channel shape within the blade. For stable fixing of the mold core, core extensions of complex configuration are required. This is because, in the case of conventional serpentine routing of the cooling channel, there must be two core extensions present towards the outside. The core extensions may interfere with one another in the outer region, especially if the core extensions have to be formed close to one another at the U deflections. This limits the construction of the channel.

It is the underlying object of the invention to provide a turbine blade which is distinguished by blade cooling that is balanced and is as efficient as possible, wherein an advantageous method of production is also achieved, and also to provide a high-pressure turbine, in particular a high-pressure turbine for a gas turbine engine, with improved cooling efficiency.

This object is achieved according to the invention in the case of a turbine blade, a method, and a high-pressure turbine having features as disclosed herein.

In the case of the turbine blade, it is furthermore envisaged in conjunction with the features of the precharacterizing clause that, in the flow direction of the cooling fluid, the inner channel portion is arranged downstream of the leading channel portion and of the trailing channel portion.

In the production of the turbine blade, use is made of a precision casting method with a mold core by means of which the cooling channel arrangement is formed in the subsequent manufacturing process. In this case, the mold core is fixed in the radially outer region of the cooling channel arrangement by means of a radially outwardly oriented core extension arrangement. According to the invention, it is envisaged that, in the radially outer region of the first deflecting portion connecting the leading and trailing channel portions, the core extension arrangement is formed by means of just one core extension. This simplified manufacture in comparison with a conventional production method is made possible by the fact that the core extension at the first deflecting portion fully fixes the core on the outside, whereas, to achieve this in the case of a conventional embodiment, two extension arms would have to be held fast in the casting process for the core that produces the cooling channels.

By virtue of the arrangement of the cooling channel portions which are disclosed herein, more balanced cooling of the blade body over the pressure side and the suction side, in particular also in the region of the leading edge and the trailing edge and in the radially outer blade region, is obtained as compared with previous embodiments, and therefore improved cooling efficiency is achieved. The arrangement of the channel portions results in combined advantages of the kind offered by channel arrangements with forward-directed and rearward-directed cooling fluid flow.

In this case, a turbine blade that is particularly advantageous in respect of construction and cooling function is obtained by virtue of the fact that, at the downstream end of the inner or central channel portion, the said channel portion is fluidically connected in a connecting region, via a passage opening, to a region of equal or lower cooling fluid pressure, which is produced in the first deflecting portion connecting the leading channel portion and the trailing channel portion. By virtue of this connection of the inner channel portion via its downstream end in the connecting region between the leading and the trailing channel portion in the region of the lower cooling fluid pressure present there, continuous flow of the cooling fluid within the turbine blade is ensured. During production, simple, stable core fixing by means of a single core extension is achieved by attachment of the core extension in this region, thereby also resulting in significant advantages in the production method.

For the cooling function and routing of the cooling channel, it is advantageous that the first and the second deflecting portion are of U-shaped design with two U-legs, which merge into the associated two channel portions, and a bent U-web comprising a concave curved region, and that the connecting region is arranged on the upstream side, centrally, or on the downstream side in the concave curved region of the U-web of the first deflecting portion. In this case, the alternative arrangements of the connecting region in the region of the U-web in conjunction with the cooling channel design and the respective blade airfoil offer optimized possibilities for adaptation in respect of the cooling function.

For efficient cooling of the turbine blade in the interior, the cooling fluid must flow through the cooling channels in order to develop a cooling effect. In order to ensure a cooling effect which is as good as possible, the cooling fluid can be discharged through film cooling holes on the pressure side and/or the suction side.

Cooling efficiency combined with balanced cooling of the turbine blade can also be advantageously influenced by providing at least one subsection of the cooling channel with an obstacle structure or turbulators for eddy formation in the flow profile of the cooling fluid. The eddies in the cooling fluid ensure that heat transfer and heat distribution in the blade airfoil are evened out.

Further advantageous measures for efficient and balanced cooling of the turbine blade are obtained by virtue of the fact that the flow cross sections are configured in cross-sectional area and/or contour with regard to a desired temperature distribution over the pressure-side blade surface and the suction-side blade surface.

Figure 2:
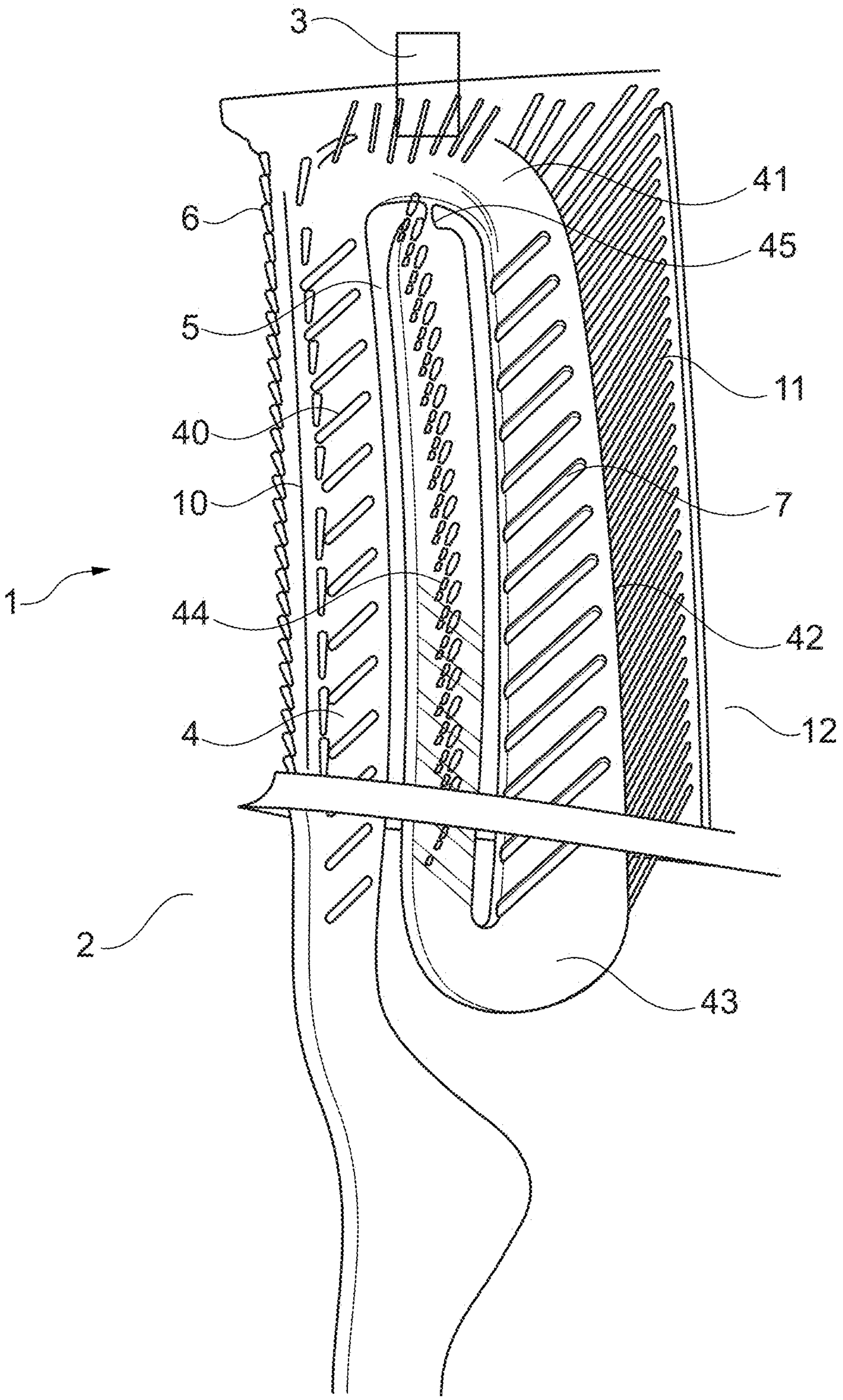

The invention will be explained in more detail in the following text by way of exemplary embodiments with reference to the drawings, in which:

FIG. 1 shows a cross section of a turbine blade with a leading channel portion, an inner channel portion, and a trailing channel portion arranged therein, and FIG. 2 shows a longitudinal section (in the manner of a meridian section) along a substantially radially oriented sectional surface of a turbine blade with a blade airfoil extending radially between a centrally located platform and a radially outer holding part.

FIG. 1 shows, by way of example, a cross section through a blade airfoil 12 of a turbine blade 1, e.g. in the central region with respect to the radial extent thereof. The blade airfoil 12 has a pressure-side wall portion 10 and a suction-side wall portion 11, which extend from a leading edge 15 (LE) to a trailing edge 16 (TE) and merge into one another in these edge regions. The pressure-side wall portion 10 and the suction-side wall portion 11 surround a cooling channel arrangement 4 formed in the interior of the blade airfoil 12 and having a leading channel portion 40, a trailing channel portion 42, and an inner channel portion 44 arranged between the said portions, which are separated from one another by partition wall portions 13, 14 (as far as deflecting portions shown in FIG. 2).

FIG. 2 shows a longitudinal section through the blade airfoil 12 of a turbine blade 1, the said airfoil being arranged on a centrally located platform 2 and extending substantially radially outwards.

The cooling channel arrangement 4 formed in the blade airfoil 12 of the turbine blade 1 has (in respect of an operating state of a gas turbine having such turbine blades 1) the leading channel portion 40, which is situated in the region of a leading edge 15 and is oriented substantially radially outwards, the trailing channel portion 42, which is connected thereto via a first deflecting portion 41 bent in a U shape, is oriented substantially radially inwards and is situated in the region of the trailing edge 16, and the inner, spatially central channel portion 44, which is connected thereto via a second deflecting portion 43 bent in a U shape, is oriented substantially radially outwards and is arranged in the central region of the turbine blade 1—the region situated between the leading edge 15 and the trailing edge 16—and is therefore arranged between the leading channel portion 40 and the trailing channel portion 42. Between the leading edge 15 and the trailing edge 16, the blade airfoil 12 has the pressure-side wall portion 10 and the suction-side wall portion 11, which delimits the channel portions 40, 42, 44 respectively on the pressure side and the suction side thereof. In the interior of the blade airfoil 12, the channel portions 40, 42, 44 are delimited laterally (as far as the deflecting portions 41, 43) by the substantially radially extending partition wall portions 13, 14 of the partition wall arrangement 5, which extend between the pressure-side wall portion 10 and the suction-side wall portion 11 of the blade airfoil 12, as can be seen from FIG. 1.

In accordance with the above-described design of the cooling channel arrangement 4, the U-shaped first deflecting portion 41 with its bent U-web and the adjoining legs that merge into the associated channel portions 40, 42 is opened up further than the U-shaped second deflecting portion 43, situated centrally in the present case, which likewise has a U-web which traverses an arc and adjoining U legs that merge into the associated channel portions 42, 44. In its downstream end region, the inner or central channel portion 44 is fluidically connected, via a connecting region 45, to the concave inner side of the first deflecting portion 41 (via the opening formed). In this connecting region of the first deflecting portion 41, a zone of similar, preferably lower, fluid pressure than that in the downstream end region of the inner channel portion 44 is generated by the shaping of the flow channel or flow cross section in this region (in respect of an operating state). Consequently, a flow of the cooling fluid in the cooling channel which is preferably continuous is brought about between the inner channel portion 44 and the first deflecting region 41 and thus the adjoining region of the cooling channel in the flow direction. These measures make a significant contribution to efficient, largely balanced cooling of the turbine blade 1.

To promote balanced cooling of the turbine blade 1, the cooling channel is provided in its interior, along the inner wall surface, with an obstacle structure 7 in the form of turbulators, which cause eddying in the cooling fluid flow and even out the heat transfer in the associated zones. Moreover, for effective cooling, especially of the pressure-side wall portion 10 and of the suction-side wall portion 11, there are, at least in some region or regions, film cooling holes 6 between these wall portions and the cooling channel arrangement 4, the said cooling holes promoting the cooling of the associated outer wall portions or outer surface of the blade airfoil 12. In addition to the cooling channel described, the cooling channel arrangement 4 can have further cooling channels.

Apart from the cited functional advantages in cooling, the design of the turbine blade 1 with the cooling channel arrangement 4 which is arranged in this way in the blade airfoil 12 and has the connecting region 45 between the end region of the inner channel portion 44 and the first deflecting portion 41, also results in simplification of manufacture by means of the precision casting method since it is possible to use just one core extension 3 in the connecting region 45 between the end region of the inner channel portion 44 and the first deflecting portion 41 in order to stabilize the mold core, thereby eliminating a complex design of a core extension arrangement for stabilization.

The invention claimed is:

1. A turbine blade, comprising:

a blade airfoil, which has a pressure-side wall portion and a suction-side wall portion and, with respect to an installed state, extends radially and with an axial inclination from a leading edge to a trailing edge, and internally including a cooling channel arrangement including at least one cooling channel, the at least one cooling channel including:

a leading channel portion, which extends at least predominantly radially, close to the leading edge, a trailing channel portion, which extends at least predominantly radially, close to the trailing edge, an inner channel portion positioned between the leading channel portion and the trailing channel portion and oriented at least predominantly radially, and a first deflecting portion and a second deflecting portion, which each connect respectively, two of the leading channel portion, the trailing channel portion and the inner channel portion, wherein, in relation to a cooling fluid passed through the cooling channel arrangement during a cooling operation, the leading channel portion or the trailing channel portion forms an inlet of the at least one cooling channel, wherein, in a flow direction of the cooling fluid, the inner channel portion is arranged downstream of the leading channel portion and of the trailing channel portion.

2. The turbine blade according to claim 1, wherein, at a downstream end of the inner channel portion, the inner channel portion is fluidically connected in a connecting region, via a passage opening, to a region of equal or lower cooling fluid pressure, which is produced in the first deflecting portion connecting the leading channel portion and the trailing channel portion.

3. The turbine blade according to claim 2, wherein the first deflecting portion and the second deflecting portion are of U-shaped configuration with two U-legs that merge into the two of the leading channel portion, the trailing channel portion and the inner channel portion, and a bent U-web comprising a concave curved region, and wherein the connecting region is arranged on an upstream side, centrally, or on a downstream side in the concave curved region of the U-web of the first deflecting portion.

4. The turbine blade according to claim 1, wherein the pressure-side wall portion and/or the suction-side wall portion include film cooling holes.

5. The turbine blade according to claim 1, wherein at least one subsection of the at least one cooling channel includes an obstacle structure for eddy formation in a flow profile of the cooling fluid.

6. The turbine blade according to claim 1, wherein flow cross sections are configured in cross-sectional areas and/or contour with regard to uniform temperature distribution over the pressure-side wall portion and the suction-side wall portion.

7. The turbine blade according to claim 1, wherein the turbine blade is a gas turbine engine turbine blade.

8. A method for producing a turbine blade, comprising:

providing that the turbine blade comprises:

a blade airfoil, which has a pressure-side wall portion and a suction-side wall portion and, with respect to an installed state, extends radially and with an axial inclination from a leading edge to a trailing edge, and internally including a cooling channel arrangement including at least one cooling channel, the at least one cooling channel including:

a leading channel portion, which extends at least predominantly radially, close to the leading edge, a trailing channel portion, which extends at least predominantly radially, close to the suction edge, an inner channel portion positioned between the leading channel portion and the trailing channel portion and oriented at least predominantly radially, and a first deflecting portion and a second deflecting portion, which each connect respectively, two of the leading channel portion, the trailing channel portion and the inner channel portion, wherein, in relation to a cooling fluid passed through the cooling channel arrangement during a cooling operation, the leading channel portion or the trailing channel portion forms an inlet of the at least one cooling channel, wherein, in a flow direction of the cooling fluid, the inner channel portion is arranged downstream of the leading channel portion and of the trailing channel portion, using a precision casting method with a mold core that forms the cooling channel arrangement in a subsequent manufacturing process, fixing said mold core in a radially outer region of the cooling channel arrangement with a radially outwardly oriented core extension arrangement, wherein, in a radially outer region of the first deflecting portion connecting the leading and trailing channel portions, forming the core extension arrangement with just one core extension.

9. A high-pressure turbine for an engine, having a plurality of the turbine blade according to claim 1.

* * * * *